United States Patent
Wu

(10) Patent No.: US 12,008,475 B2
(45) Date of Patent: Jun. 11, 2024

(54) TRANSPOSED SPARSE MATRIX MULTIPLY BY DENSE MATRIX FOR NEURAL NETWORK TRAINING

(71) Applicant: NVIDIA Corporation, Santa Clara, CA (US)

(72) Inventor: Hao Wu, Santa Clara, CA (US)

(73) Assignee: NVIDIA Corporation, Santa Clara, CA (US)

(*) Notice: Subject to any disclaimer, the term of this patent is extended or adjusted under 35 U.S.C. 154(b) by 842 days.

(21) Appl. No.: 16/191,201

(22) Filed: Nov. 14, 2018

(65) Prior Publication Data
US 2020/0151571 A1     May 14, 2020

(51) Int. Cl.
G06N 3/084     (2023.01)

(52) U.S. Cl.
CPC .................. *G06N 3/084* (2013.01)

(58) Field of Classification Search
CPC .... G06N 3/0454; G06N 3/084; G06N 3/0481; G06N 5/02; G06N 3/063; G06N 3/04; G06N 3/0445; G06N 3/0635; G06F 3/0644; G06F 3/0604; G06F 7/575; G06F 3/0673; G06F 3/0656; G06F 19/22; G06F 21/552; G06F 17/30592; G06F 17/3031;
(Continued)

(56) References Cited

U.S. PATENT DOCUMENTS

| 8,762,298 B1* | 6/2014 | Ranjan | G06F 21/552 706/12 |
| 10,430,493 B1* | 10/2019 | Kendall | G11C 13/0028 |

(Continued)

FOREIGN PATENT DOCUMENTS

| CN | 106407158 A | 2/2017 |
| CN | 107301668 A | 10/2017 |

(Continued)

OTHER PUBLICATIONS

Zhou et al., "Deep Interest Network for Click-Through Rate Prediction," KDD, 2018, 9 pages, retrieved from https://arxiv.org/abs/1706.06978.

(Continued)

*Primary Examiner* — Mouloucoulaye Inoussa
(74) *Attorney, Agent, or Firm* — Davis Wright Tremaine LLP

(57) ABSTRACT

Machine learning systems that implement neural networks typically operate in an inference mode or a training mode. In the training mode, inference operations are performed to help guide the training process. Inference mode operation typically involves forward propagation and intensive access to certain sparse matrices, encoded as a set of vectors. Back propagation and intensive access to transposed versions of the same sparse matrices provide training refinements. Generating a transposed version of a sparse matrix can consume significant additional memory and computation resources. In one embodiment, two additional encoding vectors are generated, providing efficient operations on sparse matrices and also on transposed representations of the same sparse matrices. In a neural network the efficient operations can reduce the amount of memory needed for backpropagation and reduce power consumption.

32 Claims, 15 Drawing Sheets

(58) Field of Classification Search
CPC .......... G06F 17/16; G06F 5/01; G06F 7/5443;
G06F 9/3001; G06F 9/30036; G06F
2207/228; G16B 20/20; G16B 30/10;
H04L 63/14; H04L 2463/144; H03M
7/30; H03M 7/3082; H03M 7/6023;
H03M 7/6047; H03M 7/3066; G11C
13/0004; G11C 13/004; G11C 13/0026;
G11C 13/0028; G11C 13/0069; G11C
2213/19; G11C 2013/0073; G11C
2213/18; G11C 2213/77; H03K 19/177
See application file for complete search history.

(56) References Cited

U.S. PATENT DOCUMENTS

| | | | |
|---|---|---|---|
| 2014/0108481 A1 | 4/2014 | Davis et al. | |
| 2015/0242484 A1* | 8/2015 | Zhao | G06F 16/22 707/755 |
| 2015/0378696 A1* | 12/2015 | Boehm | G06F 8/445 717/149 |
| 2016/0099723 A1* | 4/2016 | Kletter | H03M 7/3084 341/51 |
| 2016/0140084 A1* | 5/2016 | Daga | G06F 17/16 708/207 |
| 2016/0179750 A1* | 6/2016 | Zhou | G06F 17/16 708/203 |
| 2016/0232291 A1* | 8/2016 | Kyriazopoulou-Panagiotopoulou | G16B 20/20 |
| 2016/0259826 A1* | 9/2016 | Acar | G06F 16/9535 |
| 2017/0090924 A1 | 3/2017 | Mishra et al. | |
| 2017/0132496 A1 | 5/2017 | Shoaib et al. | |
| 2017/0147531 A1 | 5/2017 | Bekas et al. | |
| 2017/0193361 A1 | 7/2017 | Chilimbi et al. | |
| 2017/0206405 A1* | 7/2017 | Molchanov | G06K 9/627 |
| 2017/0293659 A1 | 10/2017 | Huang | |
| 2018/0004496 A1* | 1/2018 | Rong | G06F 8/443 |
| 2018/0046914 A1 | 2/2018 | Li et al. | |
| 2018/0052611 A1* | 2/2018 | Guilford | G06F 3/0608 |
| 2018/0157969 A1 | 6/2018 | Xie et al. | |
| 2018/0357753 A1* | 12/2018 | Lehtinen | G06N 3/0454 |
| 2019/0012296 A1* | 1/2019 | Hsieh | G06N 3/0445 |
| 2019/0042542 A1* | 2/2019 | Narayanamoorthy | G06F 9/3016 |
| 2019/0046068 A1* | 2/2019 | Ceccaldi | G06V 10/764 |
| 2019/0115933 A1* | 4/2019 | Chen | G06N 3/04 |
| 2019/0235780 A1* | 8/2019 | DeBenedictis | G06F 3/0604 |
| 2019/0278600 A1* | 9/2019 | Frumkin | G06N 3/0472 |
| 2020/0117700 A1* | 4/2020 | Chatterjee | G06N 3/08 |
| 2020/0133994 A1* | 4/2020 | Chatterjee | G06F 9/3001 |

FOREIGN PATENT DOCUMENTS

| | | |
|---|---|---|
| CN | 107590533 A | 1/2018 |
| CN | 107944555 A | 4/2018 |
| CN | 108229681 A | 6/2018 |
| CN | 108322221 A | 7/2018 |
| IN | 108280514 A | 7/2018 |
| WO | 2018022821 A1 | 2/2018 |
| WO | 2018070376 A1 | 4/2018 |
| WO | 2018125250 A1 | 7/2018 |

OTHER PUBLICATIONS

Cheng et al., "Wide & Deep Learning for Recommender Systems," arXiv, 2016, 4 pages, retrieved from https://arxiv.org/abs/1606.07792.

IEEE, "IEEE Standard 754-2008 (Revision of IEEE Standard 754-1985): IEEE Standard for Floating-Point Arithmetic," Aug. 29, 2008, 70 pages.

Office Action for Chinese Application No. 201910467136.6, dated Feb. 22, 2023, 21 pages.

Office Action for Chinese Application No. 201910467136.6, dated Nov. 16, 2023, 10 pages.

Office Action for Chinese Application No. 201910467136.6, mailed Feb. 29, 2024, 20 pages.

* cited by examiner

Column Number:
0 1 2 3 4 5

$$\begin{matrix} & 0 & 1 & 2 & 3 & 4 & 5 \\ 0 & 0 & 11 & 22 & 0 & 0 & 0 \\ 1 & 0 & 0 & 33 & 0 & 0 & 0 \\ 2 & 0 & 0 & 4 & 55 & 0 & 0 \\ 3 & 0 & 0 & 6 & 0 & 0 & 0 \\ 4 & 0 & 0 & 0 & 0 & 7 & 0 \\ 5 & 8 & 0 & 0 & 0 & 0 & 9 \end{matrix}$$

Row Number (vertical axis) ~180 data: [ 11, 22, 33, 4, 55, 6, 7, 8, 9 ]

row_ptr [ 0, 2, 3, 5, 6, 7, 9 ]

col_ind: [ 1, 2, 2, 2, 3, 2, 4, 0, 5 ]

~182 col_to_nzcol: [ 1, 2, 2, 2, 3, 2, 4, 0, 5 ]

nzcol_indices: [ 0, 1, 2, 3, 4, 5 ]

```
#234567890
import numpy as np def dense_to_sparse(mat):
    """Given a dense input, return extended CSR format"""
    # Get number of rows and columns
    num_row, num_col = mat.shape

# Initialization
    indices = []
    indptr = [0]
    data = []
    col_to_nzcol = []
    nzcol_indices = []
    num_nonzero = 0
    num_nzcol = 0
    col_has_nz = [False] * num_col
```

From Figure 2A

220

```
#234567890
    # loop through all values in the matrix,
    # find nonzero values,
    # generate CSR format
    # and gather information of columns  have nonzeros
    for i in range(num_row):
        for j in range(num_col):
            if mat[i][j] != 0:
                indices.append(j)
                data.append(mat[i][j])
                if i >= len(indptr):
                    indptr.append(num_nonzero)
                col_has_nz[j] = True
                num_nonzero += 1
    indptr.append(num_nonzero)

# Generate additional vectors for nonzero columns
    nzcol_map = []   # Temperary map
    for i, has_nz in enumerate(col_has_nz):
        nzcol_map.append(num_nzcol)
        if has_nz:
            nzcol_indices.append(i)
            num_nzcol += 1
    for i in range(num_nonzero):
        col_to_nzcol.append(nzcol_map[indices[i]])

return {'indices': indices,
            'indptr': indptr,
            'data': data,
            'col_to_nzcol': col_to_nzcol,
            'nzcol_indices': nzcol_indices,
            'num_nonzero': num_nonzero,
            'num_nzcol': num_nzcol}
```

222 — lines from `for i in range(num_row):` through `indptr.append(num_nonzero)`

224 — lines from `# Generate additional vectors for nonzero columns` through `col_to_nzcol.append(nzcol_map[indices[i]])`

From Figure 2B

230

```
#234567890
# Calling above function by
batch = np.array([[0,  11, 22,  0,  0,  0],
                  [0,   0, 33,  0,  0,  0],
                  [0,   0,  4, 55,  0,  0],
                  [0,   6, 77,  0,  0,  0],
                  [0,   0,  0,  0,  8,  0],
                  [0,   0,  0,  0,  0,  9]])
sp_batch = dense_to_sparse(batch)
print(sp_batch)
```

*Fig. 2C*

TRANSPOSED SPARSE MATRIX MULTIPLY BY DENSE MATRIX FOR NEURAL NETWORK TRAINING

FIELD OF THE INVENTION

The present disclosure relates to matrix operations, and more particularly to a transposed sparse matrix multiply by a dense matrix for neural network training.

BACKGROUND

Training and inference operations in machine learning typically involve multiply operations on large matrices. Some of the matrices are sparse and may be stored in a compressed format to significantly reduce overall memory utilization relative to uncompressed storage formats. However, accessing data elements in compressed sparse matrices can introduce additional computational effort, reducing overall system performance and efficiency. Therefore, there is a need for addressing these issues and/or other issues associated with the prior art.

BRIEF DESCRIPTION OF THE DRAWINGS

FIG. 1E illustrates an exemplary sparse matrix and associated encoding vectors, in accordance with one embodiment.

FIG. 2A illustrates an exemplary block of code for initializing a sparse matrix encoding function, in accordance with one embodiment.

FIG. 2B illustrates an exemplary block of code for a sparse matrix encoding function, in accordance with one embodiment.

FIG. 2C illustrates an exemplary block of code for calling a sparse matrix encoding function, in accordance with one embodiment.

DETAILED DESCRIPTION

In one embodiment, an encoding of a sparse matrix is provided for efficiently performing operations on both the sparse matrix and a transposed representation of the sparse matrix. Such applications include, without limitation, machine learning systems that perform both training and inference operations using a given sparse matrix. In one embodiment, the encoding supplements a compressed sparse row (CSR) matrix format with additional index mapping to eliminate the need for a matrix transpose operation, such as during backpropogation in a neural network system. The conventional sparse matrix transpose operation requires allocated memory approximately equal to twice the number of non-zero values in the input matrix, a load operation, and a store operation. In contrast, in one embodiment, less storage is needed (1× size of the non-zero values versus 2× for conventional techniques) to perform the techniques disclosed herein.

Figure 1A:
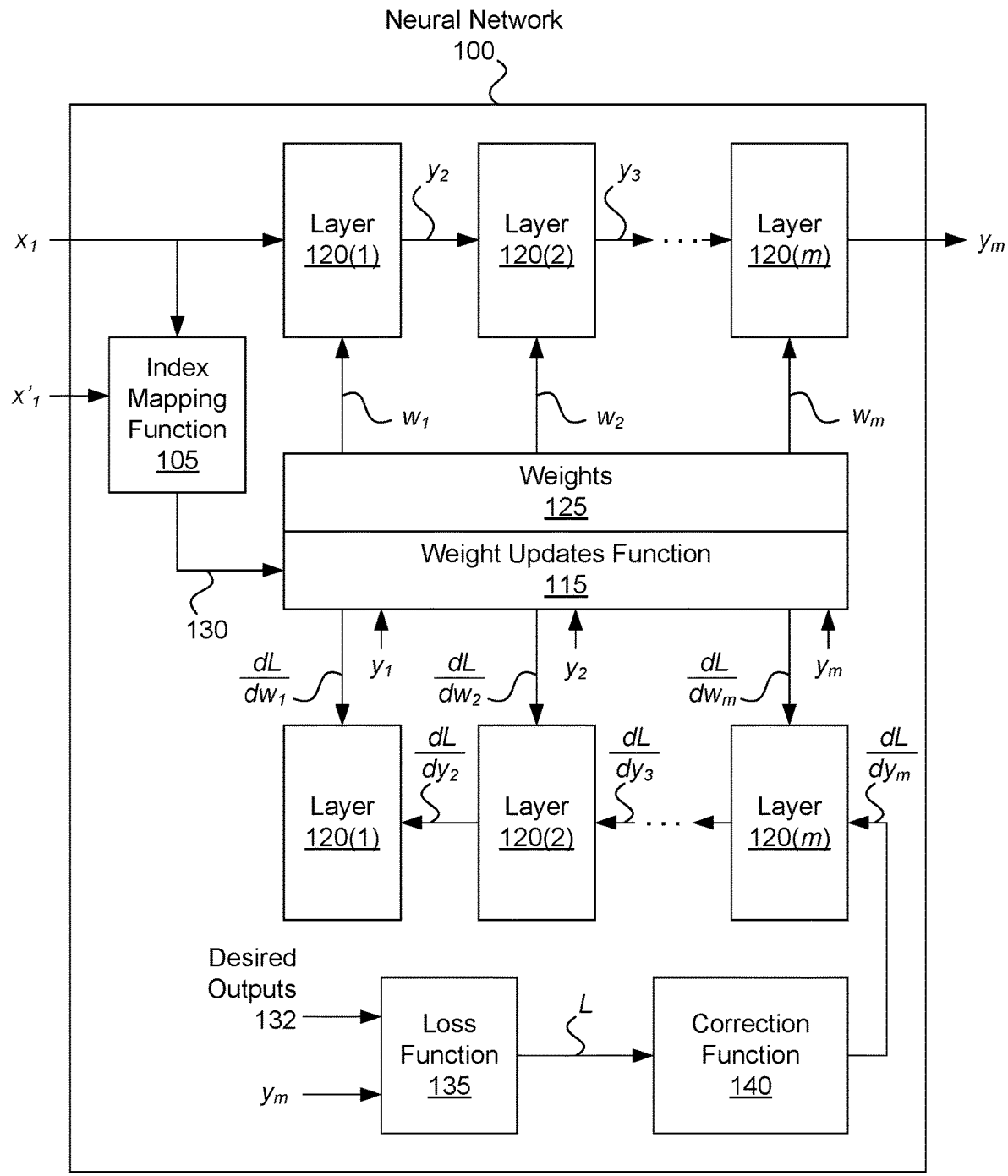
FIG. 1A illustrates a block diagram of a neural network, in accordance with one embodiment.
Figure 3:
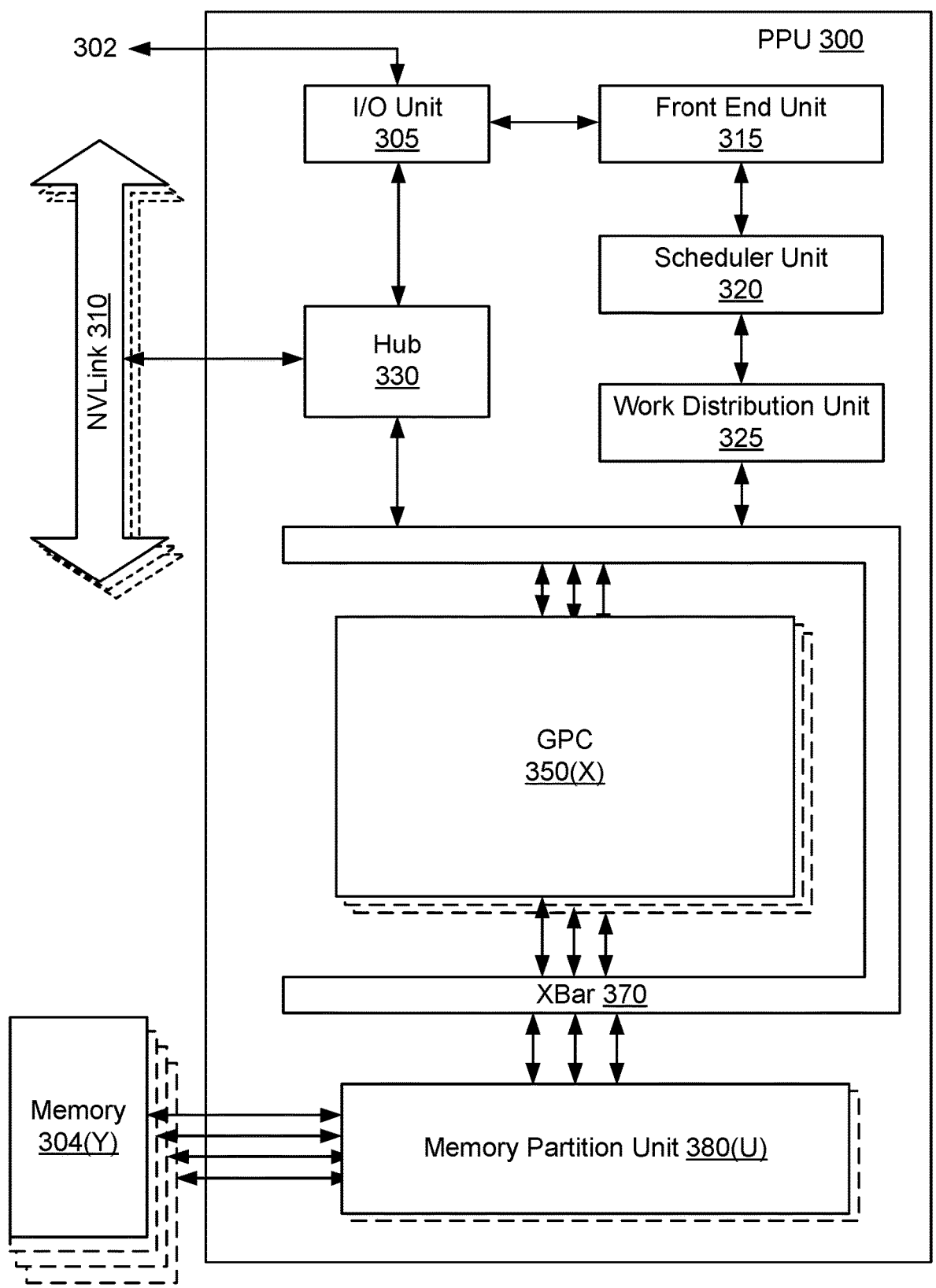
FIG. 3 illustrates a parallel processing unit, in accordance with one embodiment.

FIG. 1A illustrates a block diagram of a neural network 100, in accordance with one embodiment. Although the neural network 100 is described in the context of a processing unit, one or more subunits of the neural network 100 may be implemented as a program, custom circuitry, or by a combination of custom circuitry and a program. For example, the neural network 100 or one or more subunits of the neural network 100 may be implemented by a GPU (graphics processing unit), CPU (central processing unit), or any processor capable of implementing respective functions. In one embodiment, parallel processing unit (PPU) 300 of FIG. 3 is configured to implement the neural network 100. Furthermore, persons of ordinary skill in the art will understand that any system that performs the operations of the neural network 100 is within the scope and spirit of embodiments of the present disclosure.

As shown, the neural network 100 includes a set of m layers 120, a set of weights 125, a weight updates function 115, an index mapping function 105, a loss function 135, and a correction function 140. In one embodiment, each layer 120 comprises a collection of nodes configured to operate within a given evaluation depth of the neural network 100. The set of weights 125 may comprise storage circuits and/or a memory allocation in a memory subsystem configured to store weight matrices $w_1$ through $w_m$. In one embodiment, the weight updates function 115 may comprise storage circuits and/or a memory allocation configured to store updated weight values for w along with $$\frac{dL}{dw}$$

values $$\frac{dL}{dw_1}$$

through $$\frac{dL}{dw_m}.$$

In one embodiment, the weight updates function 115 may be written or copied to the set of weights 125, such as after training. Furthermore, in one embodiment, the weight updates function 115 may compute new weight matrices for each layer 120.

In one embodiment, the neural network 100 may be configured to operate in both training and inference modes. When the neural network 100 is operating in an inference mode, layers 120 compute features y from sparse activation input matrices x and/or computed features y from a previous layer 120, and input weight matrices w, from a set of weights 125. In one embodiment, the layer 120(1) generates features $y_2$ based on one or more sparse activation input matrices $x_1$ and input weight matrices $w_1$. In one embodiment, the layer 120(2) generates features $y_3$ based on features $y_2$ and input weight matrices $w_2$, and so forth through a set of additional layers 120 to produce a neural network output $y_m$. In one embodiment, sparse activation input matrices x are represented in a compressed format, such as a CSR format.

When the neural network 100 is operating in a training mode, the layers 120 compute output features y to generate neural network output $y_m$ according to inference mode computations. Furthermore, in one embodiment, the neural network output $y_m$ is compared to desired outputs 132 (e.g., ground truth) by a loss function 135 to generate a loss value L. Loss function 135 may implement any technically feasible loss function, such as a sum of individual error functions, a sum of distance functions, and the like. In one embodiment, the loss function 135 comprises a Euclidean distance function. The loss function 135 may also be calculated as an error or cost function.

The correction function 140 generates a difference signal $$\frac{dL}{dy_m}.$$

The correction function 140 may account for a gradient of the loss value L with respect to an output such as y. In one embodiment, the loss value L is used to compute the input to the backpropagation path through the layers 120 as $$\frac{dL}{dy_m},$$

where L is the loss computed according to the loss function 135 and $$\frac{dL}{dy_i}$$

is the derivative of L with respect to $y_i$. In one embodiment, during training, $$\frac{dL}{dy_m}$$

is backpropagated through the layers 120 reversing the operations performed on $x_1$ by the layers 120. In one embodiment, the outputs of the layers 120, $$\frac{dL}{dy_i},$$

are computed as $$w_i \frac{dL}{dy_{i+1}}.$$

For the first layer 120(1) having the inputs $x_1$ and $w_1$, in one embodiment, the features $y_2$ and the transposed input $x_1^T$ are used to compute $$\frac{dL}{dw_1}$$

which is also sparse, $$\frac{dL}{dw_1} = x_1^T \frac{dL}{dy_2}.$$

In one embodiment, the weight update function 115 calculates and updates each weight:

$$w_i = w_i - \eta \frac{dL}{dw_i},$$

where η is a learning rate.

As shown in FIG. 1A, uncompressed sparse activation input matrices are processed by the index mapping function 105 to generate two additional vectors 130 that supplement the compressed sparse activation input matrices $x_1$. Generating the additional vectors 130 is illustrated in FIG. 2B. In one embodiment, additional vectors 130 are used by the weight update function 115 to efficiently access (e.g., in row major order) one or more transposed input matrices $x_1^T$ representing transposed versions of corresponding sparse activation input matrices $x_1$. In one embodiment, to compute $$\frac{dL}{dw_1} = x_1^T \frac{dL}{dy_2},$$

sparse activation input matrix $x_1$ is read in row major order. A first vector of the additional vectors enables compression of $$\frac{dL}{dw_1}$$

by indicating which row locations in a compressed representation of $$\frac{dL}{dw_1}$$

should be written. A second vector of the additional vectors specifies the indices of columns (or rows) of the sparse activation input matrix $x_1$ containing at least one non-zero value and enables efficient decompression of $$\frac{dL}{dw_i}$$

for updating parameters of weight matrices w.

In one embodiment, the neural network 100 comprises a system that utilizes at least one sparse matrix (e.g., $x_1$) and a corresponding transposed version of the sparse matrix (e.g., $x_1^T$). The neural network 100 may alternate between training and inference operations using the at least one sparse matrix ($x_1$) and a corresponding transposed version ($x_1^T$). While various embodiments are described in the context of the neural network 100, other systems that utilize and/or access a sparse matrix and a transposed version of the same sparse matrix using the two additional vectors 130 are within the scope and spirit of various embodiments. Note that input data may be read in the same order for forward (inference) and backward (learning) propagation. Furthermore, locations of elements in the $$\frac{dL}{dw}$$

matrix to be updated are provided explicitly by the additional vectors 130, enabling efficient compression, decompression, and access with respect to the $$\frac{dL}{dw}$$

matrix.

Figure 1B:
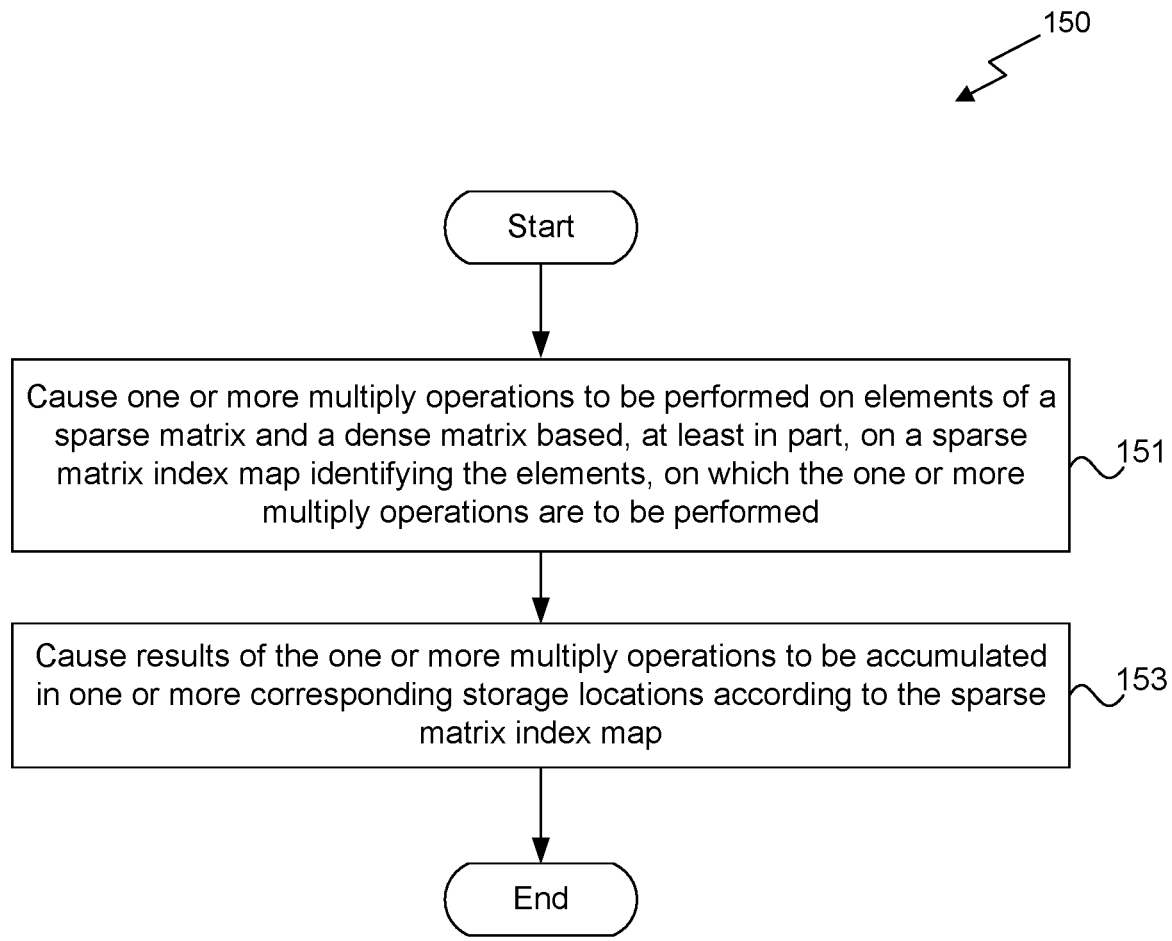
FIG. 1B illustrates a flowchart of a method for determining locations in a product matrix, in accordance with one embodiment.

FIG. 1B illustrates a flowchart of a method 150 for determining locations in a product matrix, in accordance with one embodiment. Although method 150 is described in the context of the neural network 100, the method 150 may also be performed by a program, custom circuitry, or by a combination of custom circuitry and a program. In one embodiment, the method 150 may be executed by a GPU (graphics processing unit), CPU (central processing unit), an application specific neural network processing unit, or any processing unit capable of implementing neural network 100 of FIG. 1A and performing the method 150. In one embodiment, parallel processing unit (PPU) 300 of FIG. 3 is configured to perform method 150. Furthermore, persons of ordinary skill in the art will understand that any system that performs method 150 is within the scope and spirit of embodiments of the present disclosure.

At step 151, one or more multiply operations are caused to be performed on elements of a sparse matrix and a dense matrix based, at least in part, on a sparse matrix input map identifying the elements, on which the one or more multiply operations are to be performed. In one embodiment, the sparse matrix comprises the sparse input matrix (e.g., $x_1$) and the index mapping function 105 generates the sparse matrix index map. In one embodiment, the sparse matrix index map comprises the additional vectors 130. In one embodiment, the sparse matrix index map indicates locations in a storage of non-zero values of the sparse matrix.

At step 153, results of the one or more multiply operations to be accumulated in one or more corresponding storage locations according to the sparse matrix index map. In one embodiment, the storage locations indicate elements in a product matrix. In one embodiment, the results comprise a product matrix. In one embodiment, the storage locations indicate elements in a product matrix. In one embodiment, the storage locations indicate row/column indicates of elements in a product matrix. In one embodiment, the results are accumulated product terms between a transposed version of the sparse matrix and the dense matrix. In one embodiment, the neural network 100 comprises an input layer and an output layer, and the output layer is a starting point for the back propagation. In one embodiment, the storage locations comprise an allocated region within a DRAM memory subsystem. Furthermore, the storage locations may comprise another allocated region within the DRAM memory subsystem. In one embodiment, the storage locations indicate addresses for storing elements in a product matrix.

In one embodiment, the non-zero values of the sparse input matrix are read from the storage locations to compute the product matrix without performing a matrix transpose operation. In one embodiment, the dense matrix is a correction matrix. In one embodiment, $y_2$ is a correction matrix. In one embodiment, during back propagation, the product matrix is a sparse parameter update matrix computed as a product of the correction matrix and a transposed version of the sparse input matrix, by accumulating product terms of the sparse parameter update matrix into elements of a product matrix, while avoiding performing an explicit matrix transpose operation on the sparse input matrix.

Figure 1C:
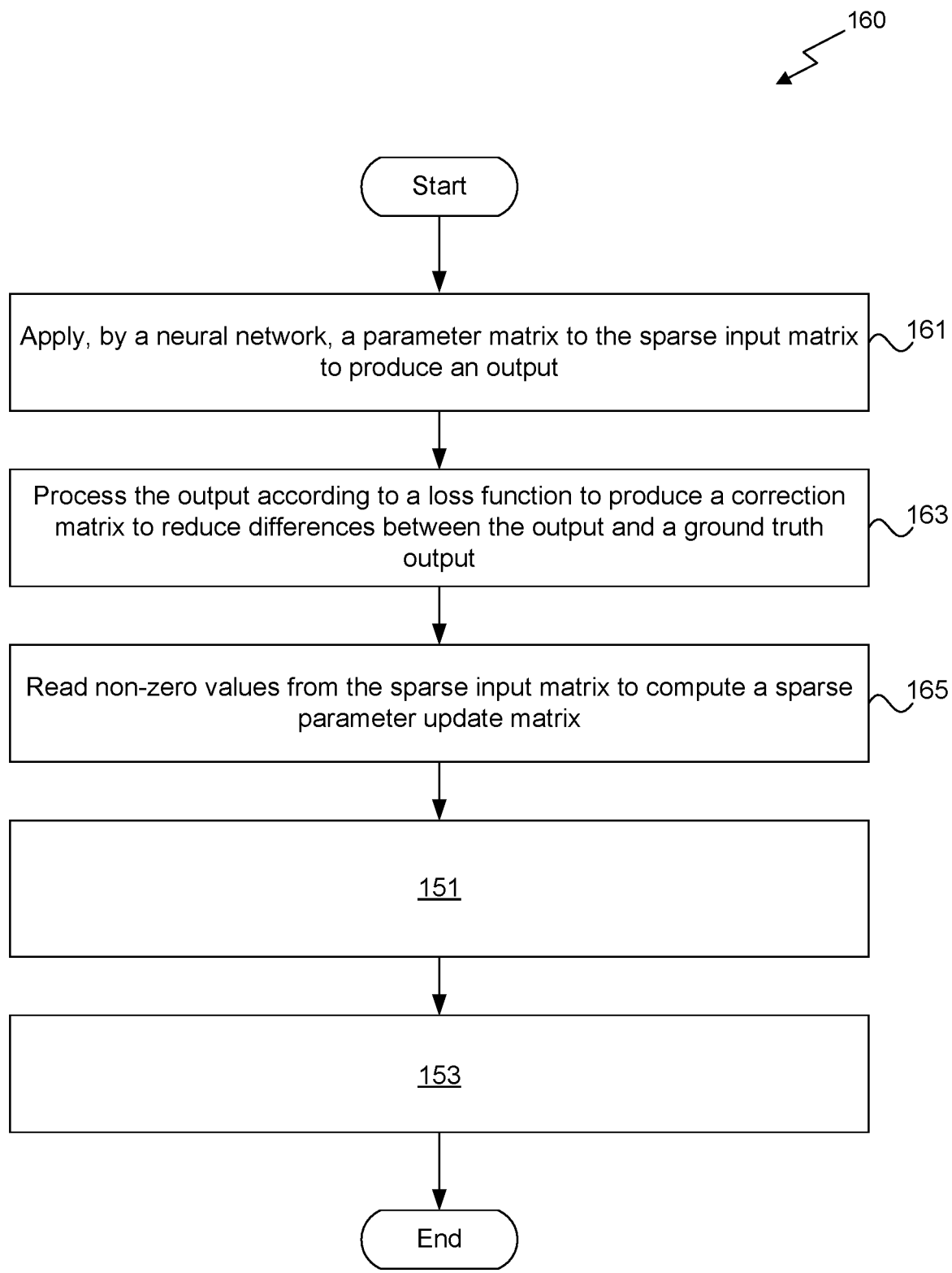
FIG. 1C illustrates a flowchart of a method for computing and storing a sparse parameter update matrix, in accordance with one embodiment.

FIG. 1C illustrates a flowchart of a method 160 for computing and storing a sparse parameter update matrix, in accordance with one embodiment. Although method 160 is described in the context of the neural network 100, the method 160 may also be performed by a program, custom circuitry, or by a combination of custom circuitry and a program. In one embodiment, the method 160 may be executed by a GPU (graphics processing unit), CPU (central processing unit), an application specific neural network processing unit, or any processing unit capable of implementing neural network 100 of FIG. 1A and performing the method 160. In one embodiment, parallel processing unit (PPU) 300 of FIG. 3 is configured to perform method 160. Furthermore, persons of ordinary skill in the art will understand that any system that performs method 160 is within the scope and spirit of embodiments of the present disclosure.

At step 161, a parameter matrix is applied to the sparse input matrix, by the neural network 100, to produce an output. In one embodiment, the neural network 100 comprises an input layer and an output layer, where the input layer receives the parameter matrix and the sparse input matrix and the output layer generates the output. In one embodiment, the neural network 100 is implemented by the PPU 300 of FIG. 3.

In one embodiment, the parameter matrix comprises a weight matrix w of FIG. 1A (e.g., weight matrices $w_1$ through $w_m$), and the sparse input matrix may include sparse input matrix (e.g., $x_1$). Furthermore, in one embodiment, the output may comprise a feature y and/or output $y_m$. At step 163, the neural network 100 processes the output according to a loss function (e.g., loss function 135) to produce a correction matrix to reduce differences between the output and a ground truth output. In one embodiment, the loss function comprises a sum of distance functions.

At step 165, the neural network 100 reads non-zero values from the sparse input matrix to compute a sparse parameter update matrix. In one embodiment, the sparse parameter update matrix is the results. At step 151, the sparse parameter update matrix is computed. In one embodiment, the sparse parameter update matrix computed at step 151 is equivalent to a product of the correction matrix and the transposed sparse input matrix, without performing a matrix transpose operation. In one embodiment, non-zero values in the sparse input matrix are identified by a CSR encoding of the sparse input matrix; furthermore, the locations of the product terms to accessed are identified by the CSR encoding, as supplemented by the two additional vectors 130.

In one embodiment, the neural network 100 processes the sparse input matrix to generate the first vector indicating locations in the sparse parameter update matrix that are written. In one embodiment, the first vector (col_to_nzcol) is calculated according to sub-block 224 of FIG. 2B. At step 153, results are accumulated into the storage locations. In one embodiment, the neural network 100 stores a compressed format of the sparse parameter update matrix comprising values. In one embodiment, only the storage locations are accessed to store the accumulated product terms of the sparse parameter update matrix.

Figure 1D:
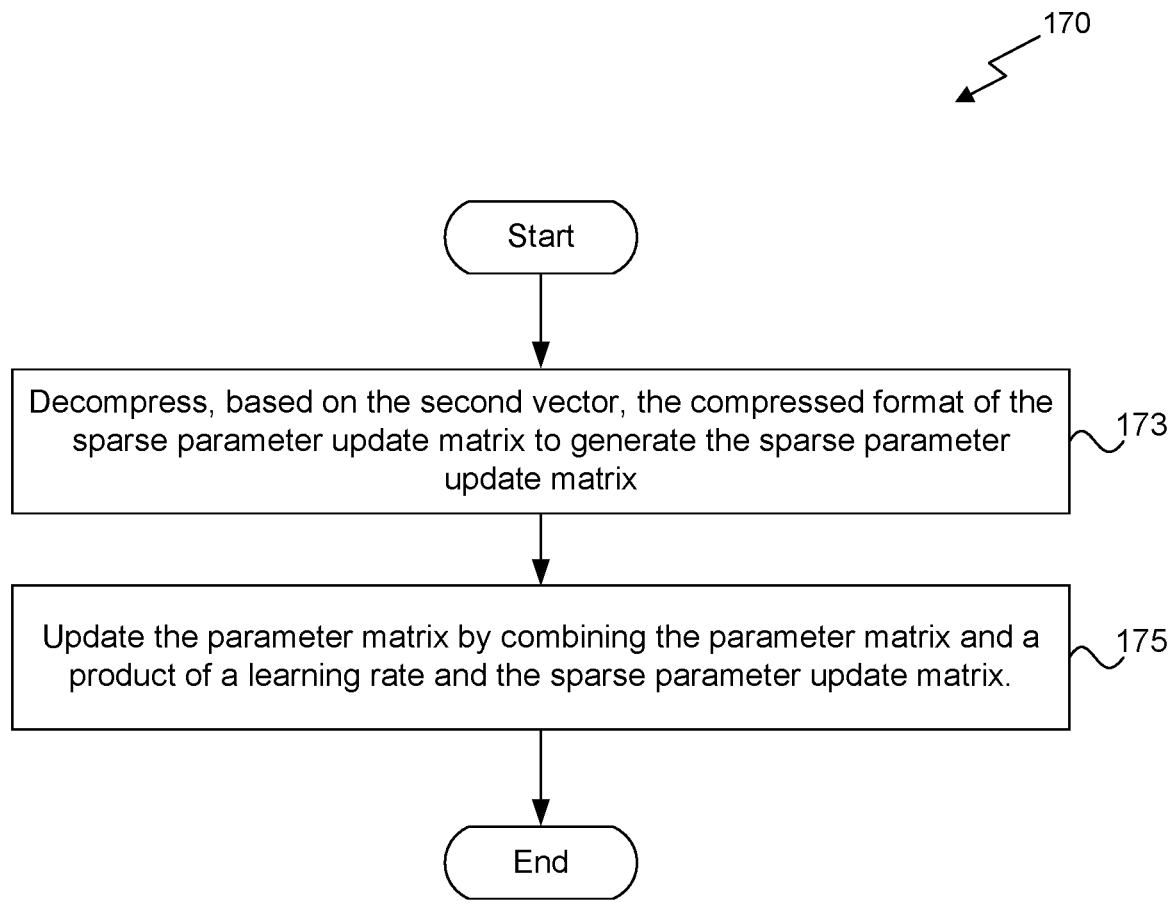
FIG. 1D illustrates a flowchart of a method for computing the sparse parameter update matrix, in accordance with one embodiment.

FIG. 1D illustrates a flowchart of a method 170 for computing the sparse parameter update matrix, in accordance with one embodiment. Although method 170 is described in the context of a processing unit, the method 170 may also be performed by a program, custom circuitry, or by a combination of custom circuitry and a program. In one embodiment, the method 170 may be executed by a GPU (graphics processing unit), CPU (central processing unit), an application specific neural network processing unit, or any processing unit capable of implementing neural network 100 of FIG. 1A and performing the method 170. In one embodiment, parallel processing unit (PPU) 300 of FIG. 3 is configured to perform method 170. Furthermore, persons of ordinary skill in the art will understand that any system that performs method 170 is within the scope and spirit of embodiments of the present disclosure.

In one embodiment, the neural network 100 computes the second vector indicating a number of columns in the sparse input matrix containing at least one non-zero value. In one embodiment, the non-zero values are identified by encoding vectors comprising the first vector and the second vector. In one embodiment, the second vector (nzcol_indices) is calculated according to sub-block 224 of FIG. 2B. In one embodiment, the second vector is generated indicating indices of columns in the sparse input matrix containing at least one non-zero value.

At step 173, the neural network 100 decompresses, based on the second vector, the compressed format of the sparse parameter update matrix to generate the sparse parameter update matrix. In one embodiment, the compressed format of the sparse parameter matrix includes only non-zero values. In one embodiment, the compressed format of the sparse parameter matrix includes only non-zero values of the product matrix.

At step 175, the neural network 100 updates the parameter matrix by combining the parameter matrix and a product of a learning rate ($\eta$) and the sparse parameter update matrix. In one embodiment, matrix terms used to calculate the product are identified using the encoding vectors. In one embodiment, the product is subtracted from the parameter matrix.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

FIG. 1E illustrates an exemplary sparse matrix 180 and associated encoding vectors 182, 184, in accordance with one embodiment. As shown, the exemplary sparse matrix 180 includes non-zero values listed in a data vector [11, 22, 33, 4, 55, 6, 7, 8, 9] of the encoding vectors 182. Furthermore, the encoding vectors 182 provide a conventional CSR encoding of the exemplary sparse matrix 180, with a row pointer vector (row_ptr) providing an association between specific elements in the data vector and rows within the exemplary matrix 180, and a column index vector (col_ind) providing an association between specific elements in the data vector and columns within the exemplary matrix 180.

Sequential elements in the row pointer vector identify a given data element as the first non-zero data element in a subsequent row within the exemplary sparse matrix 180. For example, row_ptr[0] is equal to 0, indicating the data stored at data[0] is associated with row number 0, and row_ptr[1] is equal to 2, indicating the data stored at data[1] is associated with row number 0 and the data stored at data[2] is associated with the next row (row number 1).m This is sufficient information to place data[0] and data[1] in row 0, and data [2] in row 1. Sequential elements in the column index vector indicate a column number for a corresponding data element. For example, col_ind[0] is equal to 1, indicating corresponding data element [0] is in column 1 of the exemplary sparse matrix 180, and col_ind[7] is equal to 4, indicating data[7] is in column 4.

Encoding vectors 184 comprise the two additional vectors 130 of FIG. 1A. These include a non-zero column indices vector (nzcol_indices) and a column to non-zero column vector (col_to_nzcol). The nzcol_indices vector specifies the indices of columns (or rows) of the sparse input matrix $x_1$ of FIG. 1A containing at least one non-zero value and enables efficient decompression of $$\frac{dL}{dw_i}$$

for updating parameters of weight matrices w. The col_to_nzcol vector enables compression of $$\frac{dL}{dw_i}$$

by indicating which row locations in a compressed representation of $$\frac{dL}{dw_1}$$

should be written. Computing encoding vectors 182 and 184 is illustrated using exemplary Python code in FIGS. 2A-2C. Together, encoding vectors 182 and 184 comprise a compressed representation of the sparse matrix 180.

Figure 1F:
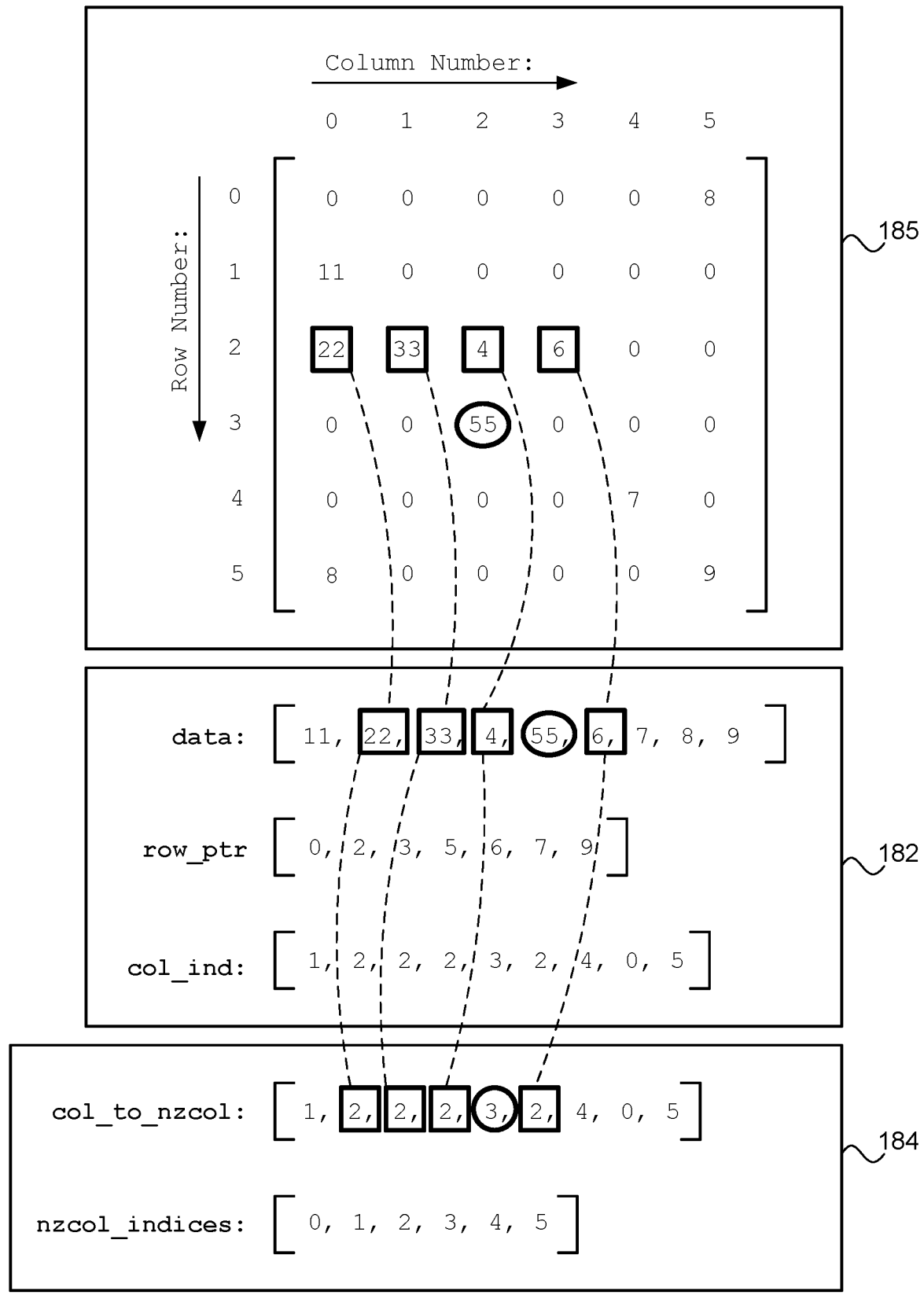
FIG. 1F illustrates an encoding vector indicating term accumulation locations in a product matrix, in accordance with one embodiment.

FIG. 1F illustrates an encoding vector indicating term accumulation locations in a product matrix, in accordance with one embodiment. As shown, the transpose matrix 185 is the transpose of sparse matrix 180. When performing a matrix multiply operation between the transpose matrix 185 and a second matrix (e.g., a dense matrix) to yield the product matrix, the encoding vector col_to_nzcol indicates the column in the product matrix into which the non-zero data entries should be accumulated. For example, data entries {22, 33, 4, 6} should all be accumulated in column 2 of the product matrix. In this way, the encoding vector col_to_nzcol re-associates data items arbitrarily distributed within the data vector to a common row of the transpose matrix 185, and therefore a common column for accumulation in the product matrix. In one embodiment, a matrix multiply including the product terms for the product matrix for transpose matrix 185 multiplied with a dense matrix is computed by reading index terms identified by entries in the encoding vector col_to_nzcol, generating corresponding product terms, and accumulating the product terms in the product matrix, based on the encoding vector col_to_nzcol entries. The product terms may be generated sequentially or in parallel. Note that actually generating or storing the transpose matrix 185 is not necessary for performing the matrix multiply operation, as data entries from sparse matrix 180 may be identified and retrieved using the encoding vectors 182 and 184 and destination locations in the product matrix may also be determined using the encoding vectors 184. In particular, performing an explicit transpose operation to generate the transpose matrix 185 is avoided by using the encoding vectors 184 to determine locations in the product matrix for accumulating the product terms.

FIG. 2A illustrates an exemplary block of code 210 for initializing a sparse matrix encoding function, in accordance with one embodiment. In one embodiment, parallel processing unit (PPU) 300 of FIG. 3 is configured to perform the calculations of the exemplary block of code 210. As shown, the exemplary block of code 210 defines a dense to sparse matrix function and initializes variables, including encoding vectors 182, 184, and a number of rows (num_row) and a number of columns (num_col) of an input matrix.

FIG. 2B illustrates an exemplary block of code 220 for a sparse matrix encoding function, in accordance with one embodiment. In one embodiment, parallel processing unit (PPU) 300 of FIG. 3 is configured to perform the calculations of the exemplary block of code 220. As shown, the exemplary block of code 220 includes a sub-block 222 and a sub-block 224. The sub-block 222 calculates encoding vectors 182 comprising a conventional CSR sparse matrix representation, while the sub-block 224 calculates encoding vectors 184 comprising the supplemental two additional vectors 130 of FIG. 1A. In particular, sub-block 224 calculates nzcol_indices and col_to_nzcol vectors. As shown, nzcol_indices is generated as a set of unique column indices from a list of column indices (col_has_nz) that each identifies a column with a non-zero row entry.

FIG. 2C illustrates an exemplary block of code 230 for calling a sparse matrix encoding function, in accordance with one embodiment. In one embodiment, parallel processing unit (PPU) 300 of FIG. 3 is configured to perform the calculations of the exemplary block of code 230. As shown, the exemplary block of code 230 defines a sample matrix, converts the sample matrix to a sparse matrix representation comprising a set of vectors (encoding vectors 182, 184), and then prints the encoding vectors.

Exemplary blocks of code 210-230 illustrate operations for generating a sparse matrix representation according to the present disclosure. Any implementation thereof is within the scope and spirit of various embodiments.

The index mapping provides an encoding of a sparse matrix for efficiently performing operations on both the sparse matrix and a transposed representation of the sparse matrix. Such applications include, without limitation, machine learning systems that perform both training and inference operations using a given sparse matrix. In one embodiment, a matrix encoding based on the index mapping eliminates the need for a matrix transpose operation, such as during backpropogation in a neural network system. Therefore, the amount of storage needed to store the weights and transfer the matrix data for updating the weights is reduced.

Parallel Processing Architecture

FIG. 3 illustrates a parallel processing unit (PPU) 300, in accordance with one embodiment. In one embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In one embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In one embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In one embodiment, the I/O unit 305 may communicate with one or more other processors, such as one or more the PPUs 300 via the interconnect 302. In one embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In one embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In one embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In one embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In one embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In one embodiment, the PPU 300 includes a number U of partition units 380 that is equal to the number of separate and distinct memory devices 304 coupled to the PPU 300. A partition unit 380 will be described in more detail below in conjunction with FIG. 4B.

In one embodiment, a host processor executes a driver kernel that implements an application programming interface (API) that enables one or more applications executing on the host processor to schedule operations for execution on the PPU 300. In one embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In one embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
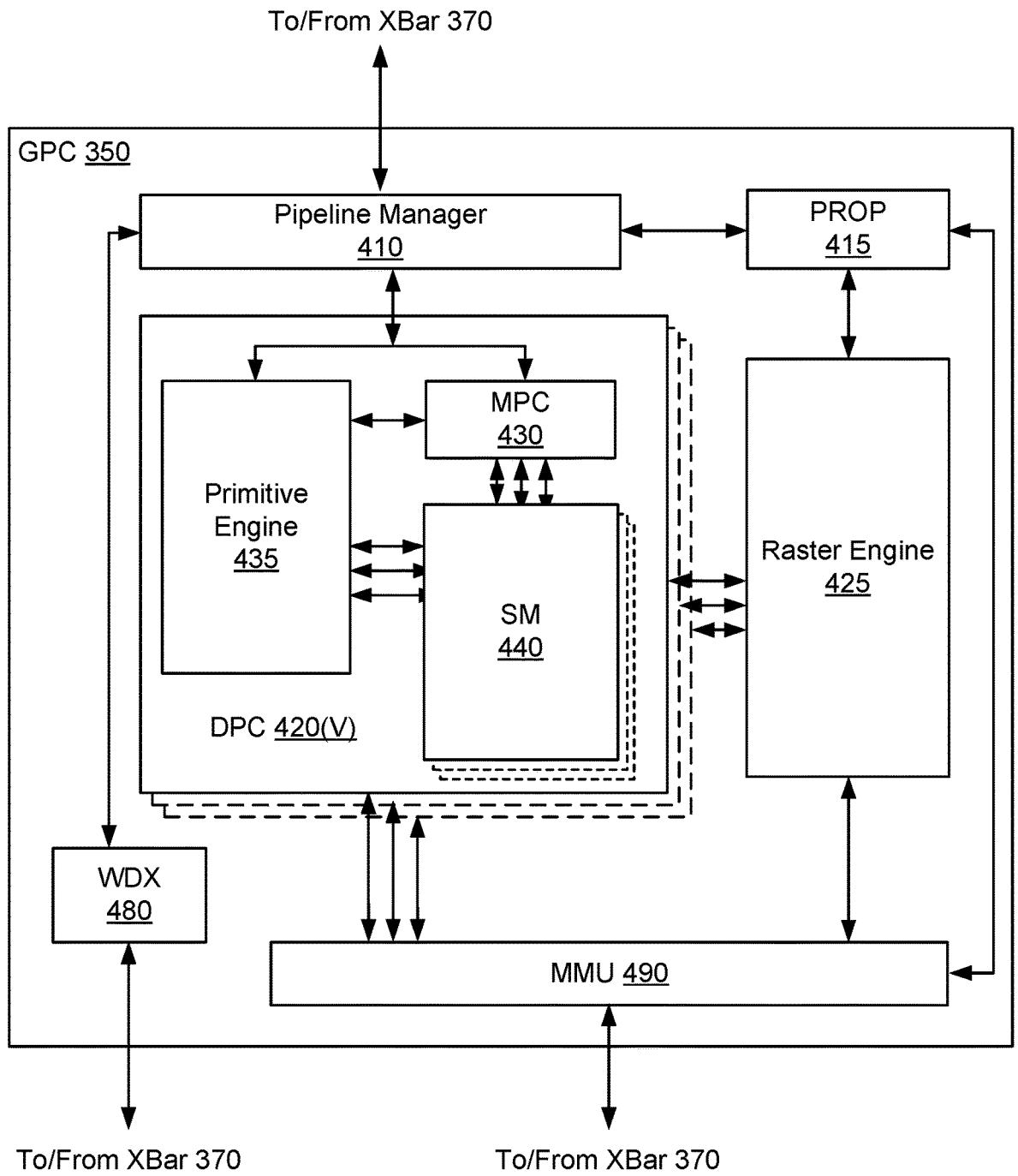
FIG. 4A illustrates a general processing cluster within the parallel processing unit of FIG. 3, in accordance with one embodiment.

FIG. 4A illustrates a GPC 350 of the PPU 300 of FIG. 3, in accordance with one embodiment. As shown in FIG. 4A, each GPC 350 includes a number of hardware units for processing tasks. In one embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In one embodiment, the operation of the GPC 350 is controlled by the pipeline manager 410. The pipeline manager 410 manages the configuration of the one or more DPCs 420 for processing tasks allocated to the GPC 350. In one embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In one embodiment, the pipeline manager 410 may configure at least one of the one or more DPCs 420 to implement a neural network model and/or a computing pipeline.

Figure 4B:
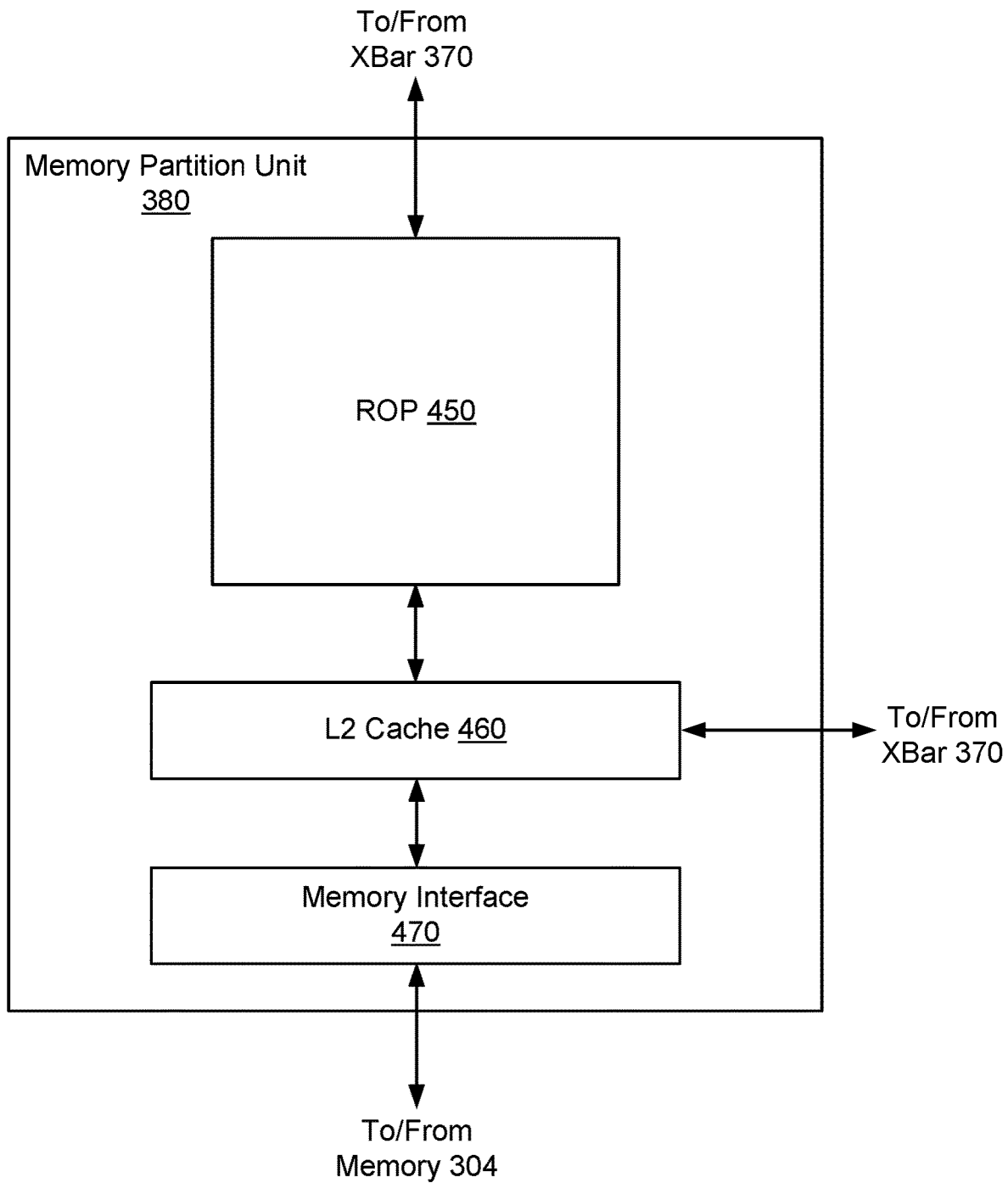
FIG. 4B illustrates a memory partition unit of the parallel processing unit of FIG. 3, in accordance with one embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In one embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In one embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In one embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In one embodiment, a program counter, call stack, and execution state is maintained for each warp, enabling concurrency between warps and serial execution within warps when threads within the warp diverge. In one embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In one embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with one embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In one embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In one embodiment, the memory interface 470 implements an HBM2 memory interface and Y equals half U. In one embodiment, the HBM2 memory stacks are located on the same physical package as the PPU 300, providing substantial power and area savings compared with conventional GDDR5 SDRAM systems. In one embodiment, each HBM2 stack includes four memory dies and Y equals 4, with HBM2 stack including two 128-bit channels per die for a total of 8 channels and a data bus width of 1024 bits.

In one embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In one embodiment, the PPU 300 implements a multi-level memory hierarchy. In one embodiment, the memory partition unit 380 supports a unified memory to provide a single unified virtual address space for CPU and PPU 300 memory, enabling data sharing between virtual memory systems. In one embodiment the frequency of accesses by a PPU 300 to memory located on other processors is traced to ensure that memory pages are moved to the physical memory of the PPU 300 that is accessing the pages more frequently. In one embodiment, the NVLink 310 supports address translation services allowing the PPU 300 to directly access a CPU's page tables and providing full access to CPU memory by the PPU 300.

In one embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
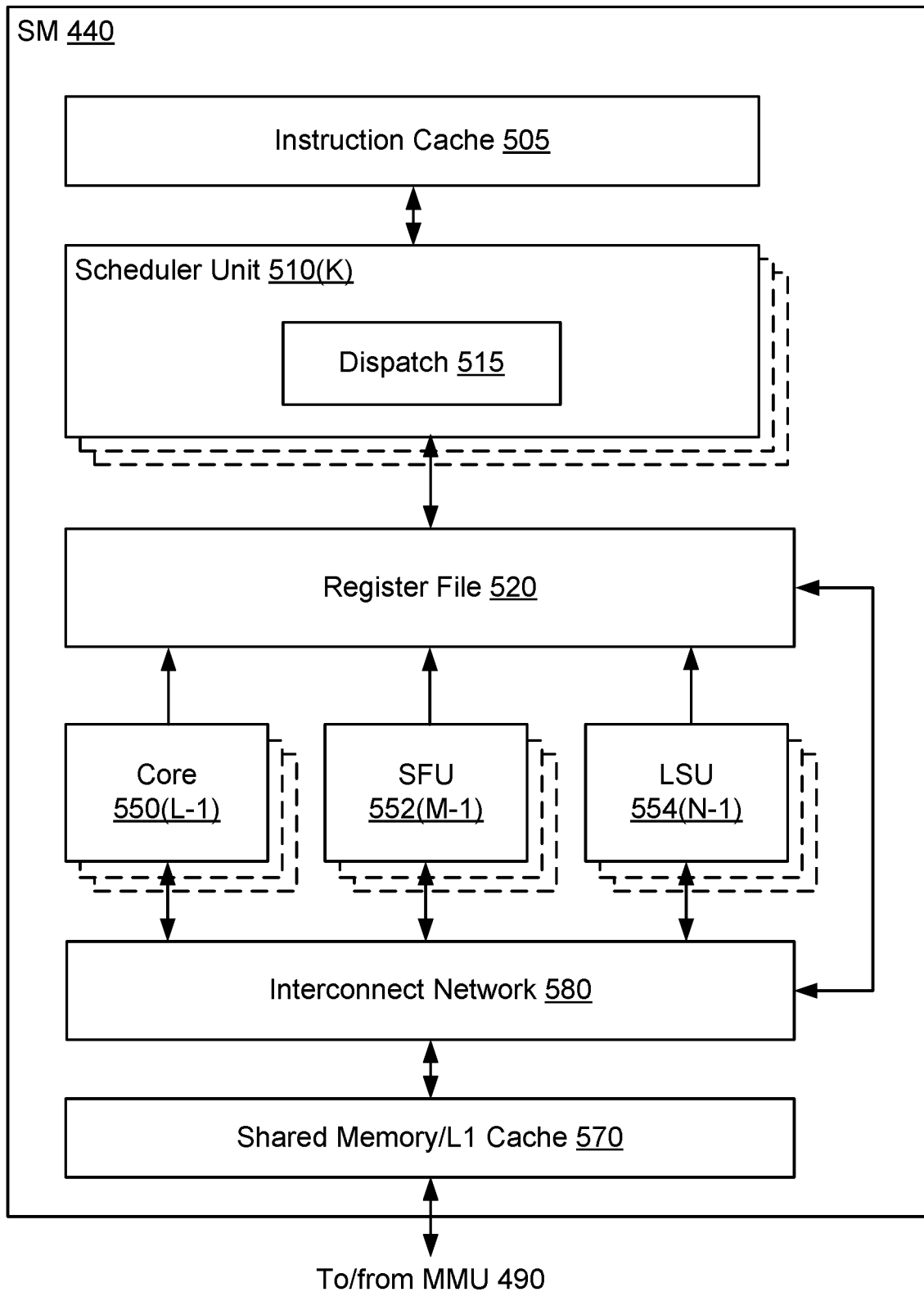
FIG. 5A illustrates the streaming multi-processor of FIG. 4A, in accordance with one embodiment.

FIG. 5A illustrates the streaming multi-processor 440 of FIG. 4A, in accordance with one embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In one embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the synethreads function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In one embodiment, the register file 520 is divided between each of the functional units such that each functional unit is allocated a dedicated portion of the register file 520. In one embodiment, the register file 520 is divided between the different warps being executed by the SM 440. The register file 520 provides temporary storage for operands connected to the data paths of the functional units.

Each SM 440 comprises L processing cores 550. In one embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In one embodiment, the floating point arithmetic logic units implement the IEEE 754-2008 standard for floating point arithmetic. In one embodiment, the cores 550 include 64 single-precision (32-bit) floating point cores, 64 integer cores, 32 double-precision (64-bit) floating point cores, and 8 tensor cores.

Tensor cores configured to perform matrix operations, and, in one embodiment, one or more tensor cores are included in the cores 550. In particular, the tensor cores are configured to perform deep learning matrix arithmetic, such as convolution operations for neural network training and inferencing. In one embodiment, each tensor core operates on a 4×4 matrix and performs a matrix multiply and accumulate operation $D=A\times B+C$, where A, B, C, and D are 4×4 matrices.

In one embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4'4 matrix multiply. In practice, Tensor Cores are used to perform much larger two-dimensional or higher dimensional matrix operations, built up from these smaller elements. An API, such as CUDA 9 C++ PI, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In one embodiment, the SFUs 552 may include a tree traversal unit configured to traverse a hierarchical tree data structure. In one embodiment, the SFUs 552 may include texture unit configured to perform texture map filtering operations. In one embodiment, the texture units are configured to load texture maps (e.g., a 2D array of texels) from the memory 304 and sample the texture maps to produce sampled texture values for use in shader programs executed by the SM 440. In one embodiment, the texture maps are stored in the shared memory/L1 cache 470. The texture units implement texture operations such as filtering operations using mip-maps (i.e., texture maps of varying levels of detail). In one embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In one embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In one embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In one embodiment, the PPU 300 is embodied on a single semiconductor substrate. In one embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In one embodiment, the PPU 300 may be included on a graphics card that includes one or more memory devices 304. The graphics card may be configured to interface with a PCIe slot on a motherboard of a desktop computer. In yet one embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
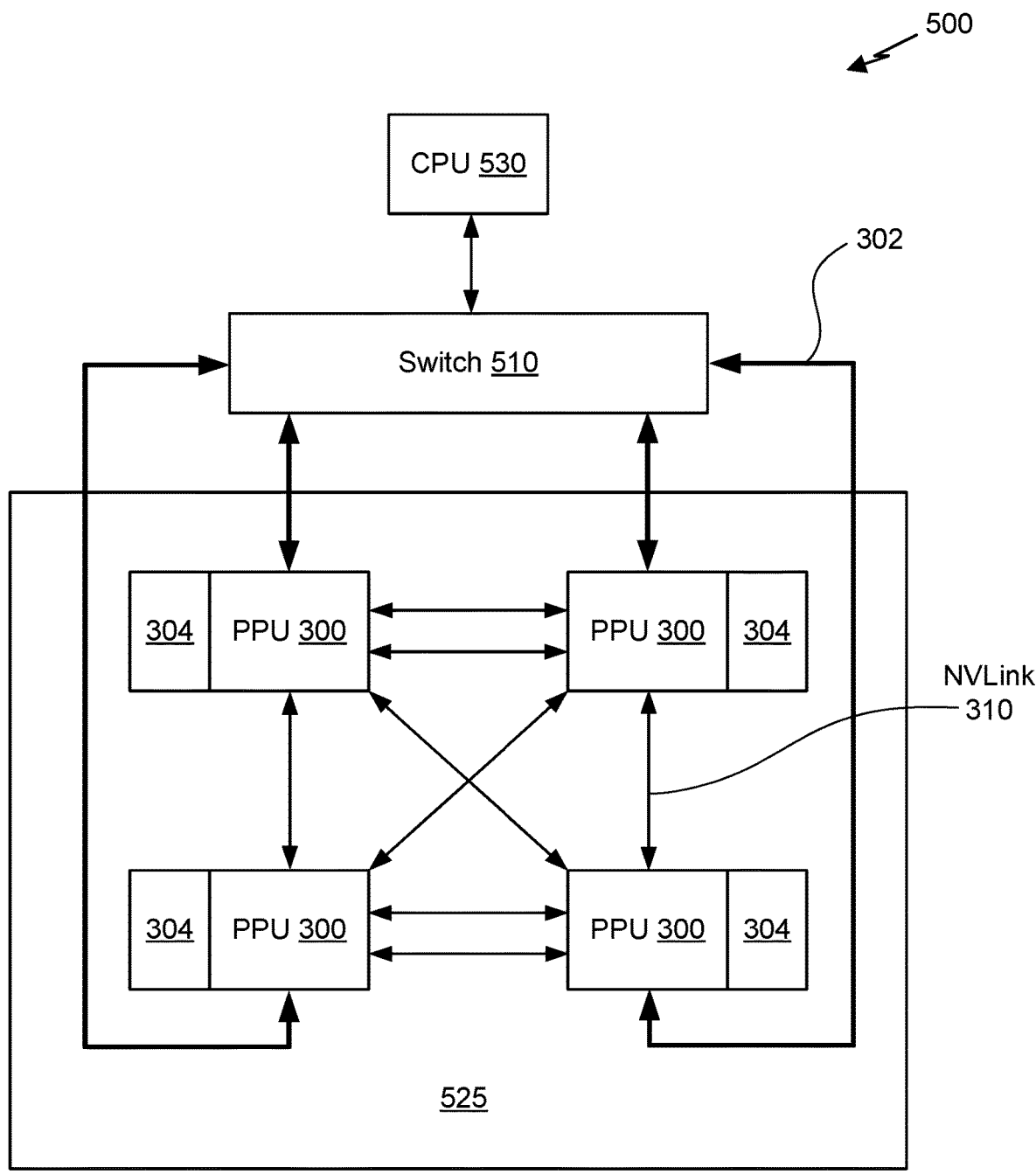
FIG. 5B is a conceptual diagram of a processing system implemented using the PPU of FIG. 3, in accordance with one embodiment.

FIG. 5B is a conceptual diagram of a processing system 500 implemented using the PPU 300 of FIG. 3, in accordance with one embodiment. In one embodiment, the processing system 500 may be configured to implement the method 150 shown in FIG. 1B. In one embodiment, the processing system 500 may be configured to implement the method 160 shown in FIG. 1C. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In one embodiment, the switch 510 supports two or more protocols to interface between various different connections and/or links.

In one embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet one embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In one embodiment (not shown), the NVLink 310 provides one or more high-speed communication links between the PPUs 300 and the CPU 530 through the switch 510. In yet one embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In one embodiment, the CPU 530, switch 510, and the parallel processing module 525 are situated on a single semiconductor platform.

In one embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In one embodiment, the NVLink 310 allows direct load/store/atomic access from the CPU 530 to each PPU's 300 memory 304. In one embodiment, the NVLink 310 supports coherency operations, allowing data read from the memories 304 to be stored in the cache hierarchy of the CPU 530, reducing cache access latency for the CPU 530. In one embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
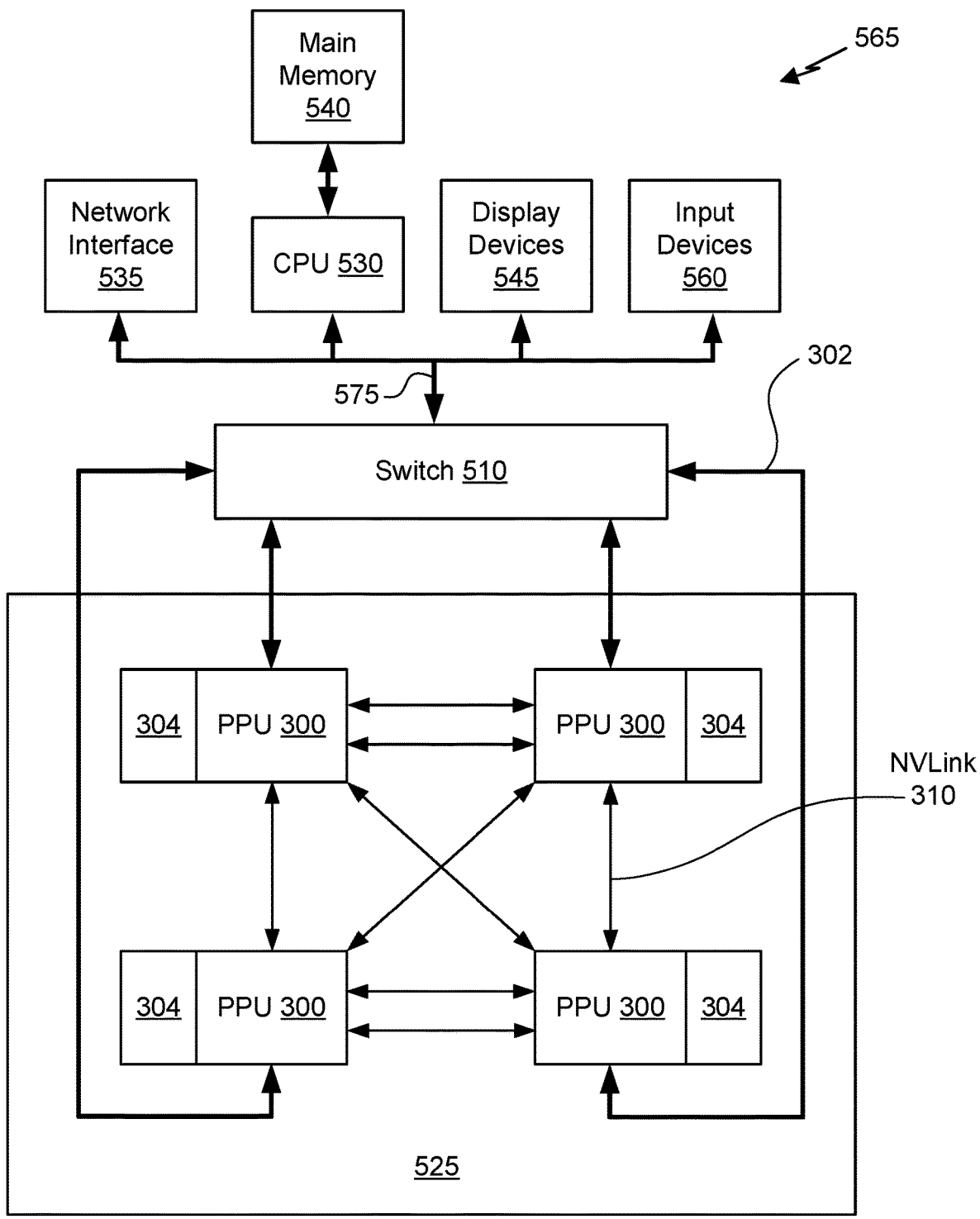
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. In one embodiment, the exemplary system 565 may be configured to implement the method 150 shown in FIG. 1B. The exemplary system 565 may be configured to implement the method 160 shown in FIG. 1C.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

In one embodiment, training and inference operations for a given neural network, such as neural network 100, access one or more sparse matrices and corresponding transposed versions of the one or more sparse matrices using the sparse matrix encoding described herein. In particular, the sparse matrix encoding may include encoding vectors 182 and encoding vectors 184.

What is claimed is:

1. A computer-implemented method, comprising:
   causing one or more multiply operations to be performed on elements of a sparse matrix and a dense matrix based, at least in part, on a sparse matrix index map identifying the elements, on which the one or more multiply operations are to be performed; and
   causing results of the one or more multiply operations to be accumulated in one or more corresponding storage locations according to the sparse matrix index map.

2. The computer-implemented method of claim 1, wherein the sparse index map includes transpose indices for columns or rows in the sparse matrix and the storage locations are determined, at least in part, using the transpose indices.

3. The computer-implemented method of claim 1, wherein the results comprise elements of a product matrix that is equivalent to a product of a transposed version of the sparse matrix and the dense matrix.

4. The computer-implemented method of claim 1, further comprising:
   applying, by a neural network, a parameter matrix to the sparse matrix to produce an output;
   processing the output according to a loss function to produce the dense matrix, wherein the dense matrix reduces differences between the output and a ground truth output; and
   accessing non-zero values of the sparse matrix to compute the results.

5. The computer implemented method of claim 4, further comprising updating the parameter matrix by combining the parameter matrix and a product of a learning rate and the product matrix.

6. The computer implemented method of claim 5, wherein the product is subtracted from the parameter matrix.

7. The computer implemented method of claim 4, wherein the loss function comprises a sum of distance functions.

8. The computer implemented method of claim 4, wherein the differences between the output and the ground truth output are computed by a correction function.

9. The computer implemented method of claim 4, wherein the neural network comprises an input layer and an output layer, and the input layer receives the parameter matrix and the sparse matrix and the output layer generates the output.

10. The computer-implemented method of claim 1, wherein the sparse matrix index map comprises a second vector indicating a indices of columns in the sparse matrix containing at least one non-zero value.

11. The computer-implemented method of claim 10, further comprising accessing, based on the second vector, the storage locations to update parameters of a neural network using the product matrix.

12. The computer-implemented method of claim 1, wherein a matrix transpose operation is avoided to accumulate the results.

13. The computer-implemented method of claim 1, wherein the results comprise elements of a product matrix and the sparse matrix index map comprises a first vector indicating elements in the product matrix.

14. The computer-implemented method of claim 1, wherein the results comprise elements of a product matrix and a compressed format of the product matrix includes only non-zero values.

15. The computer-implemented method of claim 1, wherein each product term in the results is calculated from a different entry of a data vector within the sparse matrix index map, and each storage location is identified by a corresponding entry in a column to non-zero column vector within the sparse matrix index map.

16. A system, comprising:
a parallel processing unit configured to:
performing multiply operations on elements of a sparse matrix and a dense matrix based, at least in part, on a sparse matrix index map identifying the elements, on which the one or more multiply operations are to be performed; and
accumulate results of the one or more multiply operations in one or more corresponding storage locations according to the sparse matrix index map.

17. The system of claim 16, wherein the results comprise elements of a product matrix and the sparse matrix index map comprises a first vector indicating the storage locations.

18. The system of claim 16, wherein the sparse matrix index map comprises a second vector indicating a number of columns in the sparse matrix containing at least one non-zero value.

19. The system of claim 16, wherein the sparse index map includes transpose indices for columns or rows in the sparse matrix and the storage locations are determined, at least in part, using the transpose indices.

20. The system of claim 16, wherein the results comprise elements of a product matrix that is equivalent to a product of a transposed version of the sparse matrix and the dense matrix.

21. The system of claim 16, wherein the parallel processing unit implements a neural network.

22. The system of claim 21, wherein the neural network is configured to:
apply a parameter matrix to the sparse matrix to produce an output;
process the output according to a loss function to produce the dense matrix, wherein the dense matrix reduces differences between the output and a ground truth output; and
access non-zero values from the sparse matrix to compute the results.

23. The system of claim 16, wherein each product term in the results is calculated from a different entry of a data vector within the sparse matrix index map, and each storage location is identified by a corresponding entry in a column to non-zero column vector within the sparse matrix index map.

24. A non-transitory computer-readable media storing computer instructions that, when executed by one or more processors, cause the one or more processors to perform the steps of:
performing multiply operations on elements of a sparse matrix and a dense matrix based, at least in part, on a sparse matrix index map identifying the elements, on which the one or more multiply operations are to be performed; and
accumulating results of the one or more multiply operations in one or more corresponding storage locations according to the sparse matrix index map.

25. The non-transitory computer-readable media of claim 24, wherein the sparse index map includes transpose indices for columns or rows in the sparse matrix and the storage locations are determined, at least in part, using the transpose indices.

26. The non-transitory computer-readable media of claim 24, wherein the results comprise elements of a product matrix that is equivalent to a product of a transposed version of the sparse matrix and the dense matrix.

27. The non-transitory computer-readable media of claim 24, wherein the results comprise elements of a product matrix and the sparse matrix index map comprises a first vector indicating elements in the product matrix.

28. The non-transitory computer-readable media of claim 24, wherein the sparse matrix index map comprises a second vector indicating a indices of columns in the sparse matrix containing at least one non-zero value.

29. The non-transitory computer-readable media of claim 28, further comprising accessing, based on the second vector, the storage locations to update parameters of a neural network using the product matrix.

30. The non-transitory computer-readable media of claim 24, wherein the results comprise elements of a product matrix and the sparse matrix index map comprises a first vector indicating elements in the product matrix.

31. The computer-implemented method of claim 1, wherein the sparse matrix index map is based, at least in part, on one or more indices of a compressed matrix format.

32. The computer-implemented method of claim 1, further comprising causing the one or more multiply operations to be performed on elements of a non-transposed sparse matrix and the dense matrix based, at least in part, on the sparse matrix index map indicating one or more locations of the elements as if the non-transposed sparse matrix were transposed.

* * * * *